US012689491B2

(12) United States Patent
Harada et al.

(10) Patent No.: US 12,689,491 B2
(45) Date of Patent: Jul. 21, 2026

(54) TERMINAL, BASE STATION, RADIO COMMUNICATION SYSTEM AND RADIO COMMUNICATION METHOD FOR APPLYING SUBCARRIER SPACING

(71) Applicant: NTT DOCOMO, INC., Tokyo (JP)

(72) Inventors: Hiroki Harada, Tokyo (JP); Shinya Kumagai, Tokyo (JP); Naoya Shibaike, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 311 days.

(21) Appl. No.: 18/280,131

(22) PCT Filed: Mar. 4, 2021

(86) PCT No.: PCT/JP2021/008571
§ 371 (c)(1),
(2) Date: Sep. 1, 2023

(87) PCT Pub. No.: WO2022/185498
PCT Pub. Date: Sep. 9, 2022

(65) Prior Publication Data
US 2024/0154774 A1      May 9, 2024

(51) Int. Cl.
*H04L 5/00*          (2006.01)
(52) U.S. Cl.
CPC .................................. *H04L 5/0092* (2013.01)
(58) Field of Classification Search
CPC ..... H04L 5/0092; H04L 5/003; H04L 5/0007; H04L 27/26025
See application file for complete search history.

(56) References Cited

U.S. PATENT DOCUMENTS

2019/0334753 A1* 10/2019 Tang ..................... H04W 72/04

FOREIGN PATENT DOCUMENTS

EP          3993531 A1      5/2022
WO    2020/261498 A1      12/2020

OTHER PUBLICATIONS

ZTE, Sanechips; "Discussion on the initial access aspects for 52.6 to 71 GHz"; 3GPP TSG RAN WG1 #104-e, R1-2100073; e-Meeting, Jan. 25-Feb. 5, 2021 (11 pages) (Year: 2021).*
International Search Report issued in PCT/JP2021/008571 on Sep. 14, 2021 (1 page).
Written Opinion of the International Searching Authority issued in PCT/JP2021/008571 on Sep. 14, 2021 (3 pages).

(Continued)

*Primary Examiner* — Chae S Lee
(74) *Attorney, Agent, or Firm* — Osha Bergman Watanabe & Burton LLP

(57)          ABSTRACT

A terminal comprises a control unit that applies a target subcarrier spacing lower than a specific subcarrier spacing in a target frequency band, the target frequency band includes at least a prat of a specific frequency range defined with the specific subcarrier spacing as a minimum subcarrier spacing or a frequency band lower than the specific frequency range, wherein the control unit applies a method different from an initial access method related to the specific subcarrier spacing, for at least a part of an initial access method related to the target subcarrier spacing.

4 Claims, 9 Drawing Sheets

(56) References Cited

OTHER PUBLICATIONS

Intel Corporation; "NR spectrum utilization"; 3GPP TSG-RAN WG4 Meeting #85, R4-1713688; Reno, Nevada, USA; Nov. 27-Dec. 1, 2017 (13 pages).

ZTE, Sanechips; "Discussion on the initial access aspects for 52.6 to 71 GHz"; 3GPP TSG RAN WG1 #104-e, R1-2100073; e-Meeting, Jan. 25-Feb. 5, 2021 (11 pages)

Nokia, Nokia Shanghai Bell; "Initial Access Signals and Channels for NR-U"; 3GPP TSG RAN WG1 Meeting #AH-1901, R1-1900347; Taipei, Taiwan; Jan. 21-25, 2019 (20 pages)

3GPP TS 38.101-1 V17.0.0; "3rd Generation Partnership Project; Technical Specification Group Radio Access Network; NR; User Equipment (UE) radio transmission and reception; Part 1: Range 1 Standalone (Release 17)"; Dec. 2020 (488 pages).

Office Action issued in Japanese Patent Application No. 2023-503299, issued Mar. 4, 2025 (6 pages).

Extended European Search Report issued in counterpart European Patent Application No. 21929070.7, mailed on Nov. 26, 2024 (11 pages).

Vivo; "Discussions on initial access aspects for NR operation from 52.6GHz to 71GHz"; 3GPP TSG RAN WG1 #104-e, R1-2100429; e-Meeting, Jan. 25-Feb. 5, 2021 (10 pages).

Vivo; "Discussions on initial access aspects for NR operation from 52.6GHz to 71GHz"; 3GPP TSG RAN WG1 #104b-e, R1-2102514; e-Meeting, Apr. 12-20, 2021 (16 pages).

Moderator (Intel Corporation); "[103-e-NR-52-71-Waveform-Changes] Discussions Summary #1"; 3GPP TSG RAN WG1 Meeting #103-e, R1-2009352; e-Meeting, Oct. 26-Nov. 13, 2020 (59 pages).

* cited by examiner

FIG.2

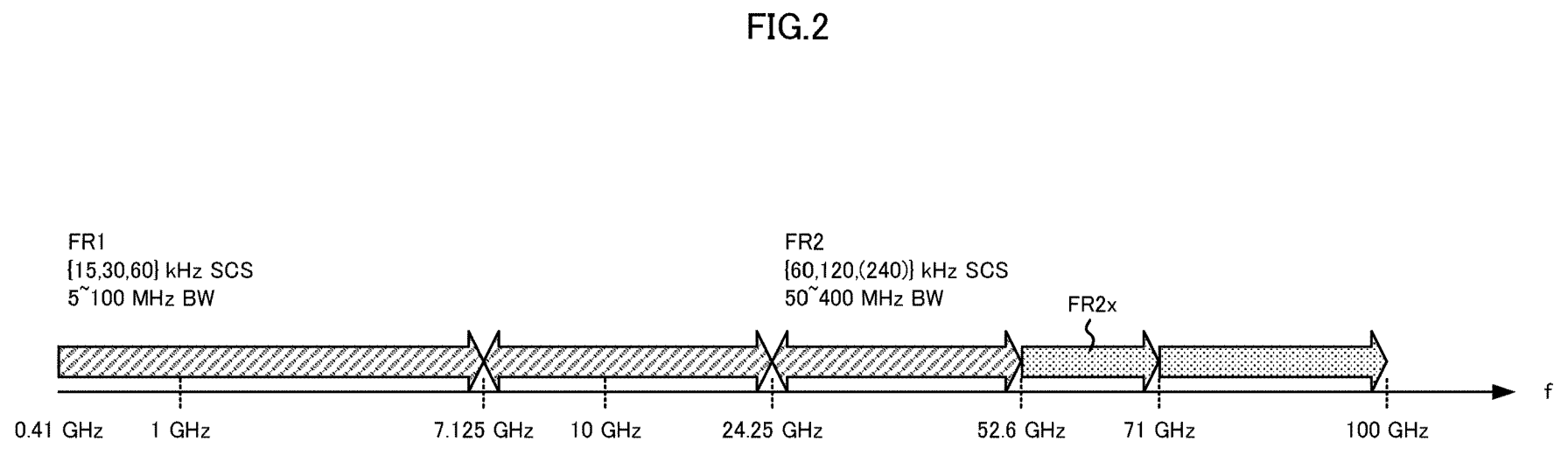

FR1
{15,30,60} kHz SCS
5~100 MHz BW

FR2
{60,120,(240)} kHz SCS
50~400 MHz BW

FR2x f 0.41 GHz   1 GHz   7.125 GHz   10 GHz   24.25 GHz   52.6 GHz   71 GHz   100 GHz

FIG.3

Slot (14-symbols)

15kHz

| #0 | #1 | #2 | #3 | #4 | #5 | #6 | #7 | #8 | #9 | #10 | #11 | #12 | #13 |

7.5kHz

| #0 | #1 | #2 | #3 | #4 | #5 | #6 | #7 |

8-symbols

···HEAD POSITION OF SYMBOL AT SYMBOL BOUNDARY

Slot (14-symbols)

15kHz: #0 #1 #2 #3 #4 #5 #6 #7 #8 #9 #10 #11 #12 #13

7.5kHz: #0 #1 #2 #3 #4 #5 #6 #7

8-symbols

···HEAD POSITION OF SYMBOL AT SYMBOL BOUNDARY

TERMINAL, BASE STATION, RADIO COMMUNICATION SYSTEM AND RADIO COMMUNICATION METHOD FOR APPLYING SUBCARRIER SPACING

TECHNICAL FIELD

The present disclosure relates to a terminal, base station, radio communication system and radio communication method for performing radio communication, in particular, a terminal, base station, radio communication system and radio communication method for applying Subcarrier Spacing (SCS).

BACKGROUND ART

The 3rd Generation Partnership Project (3GPP) has specified the 5th generation mobile communication system (Also called 5G, New Radio (NR), or Next Generation (NG)), and is also promoting the specification of the next generation called Beyond 5G, 5G Evolution or 6G.

In the above-mentioned 5G, SCS (Subcarrier Spacing) of 15 kHz, 30 kHz and 60 kHz is assumed to be used in FR (Frequency Range)1, and SCS of 60 kHz and 120 kHz is assumed to be used in FR2 (For example, Non-Patent Literature 1).

CITATION LIST

Non-Patent Literature

[Non-Patent Literature 1]
3GPP T538.101-1 V 17.0.0 3rd Generation Partnership Project; Technical Specification Group Radio Access Network; NR; User equipment (UE) radio transmission and reception; Unit 1: Range 1 Standalone (Release 17), 3GPP, December 2020

SUMMARY OF INVENTION

Against this background, the inventors and others have identified the possibility of improving the frequency utilization efficiency by utilizing a lower SCS than the existing SCS.

Accordingly, the present invention has been made in view of this situation, and it is an object of the present invention to provide a terminal, a base station, a radio communication system and a radio communication method capable of improving the frequency utilization efficiency.

An aspect of the present disclosure is a terminal comprising: a control unit that applies a target subcarrier spacing lower than a specific subcarrier spacing in a target frequency band, the target frequency band includes at least a part of a specific frequency range defined with the specific subcarrier spacing as a minimum subcarrier spacing or a frequency band lower than the specific frequency range, wherein the control unit applies a method different from an initial access method related to the specific subcarrier spacing, for at least a part of an initial access method related to the target subcarrier spacing.

An aspect of the present disclosure is a base station comprising: a control unit that applies a target subcarrier spacing lower than a specific subcarrier spacing in a target frequency band, the target frequency band includes at least a part of a specific frequency range defined with the specific subcarrier spacing as a minimum subcarrier spacing or a frequency band lower than the specific frequency range, wherein the control unit applies a method different from an initial access method related to the specific subcarrier spacing, for at least a part of an initial access method related to the target subcarrier spacing.

An aspect of the present disclosure is a radio communication system comprising: a terminal; and a base station; wherein the terminal and the base station comprise a control unit that applies a target subcarrier spacing lower than a specific subcarrier spacing in a target frequency band, the target frequency band includes at least a part of a specific frequency range defined with the specific subcarrier spacing as a minimum subcarrier spacing or a frequency band lower than the specific frequency range, and the control unit applies a method different from an initial access method related to the specific subcarrier spacing, for at least a part of an initial access method related to the target subcarrier spacing.

An aspect of the present disclosure is a radio communication method comprising: applying a target subcarrier spacing lower than a specific subcarrier spacing in a target frequency band, the target frequency band includes at least a part of a specific frequency range defined with the specific subcarrier spacing as a minimum subcarrier spacing or a frequency band lower than the specific frequency range, and applying a method different from an initial access method related to the specific subcarrier spacing, for at least a part of an initial access method related to the target subcarrier spacing.

BRIEF DESCRIPTION OF DRAWINGS

FIG. 2 shows a frequency range used in the radio communication system 10.

FIG. 3 shows a configuration example of a radio frame, a sub-frame and a slot used in the radio communication system 10.

MODES FOR CARRYING OUT THE INVENTION

Figure 1:
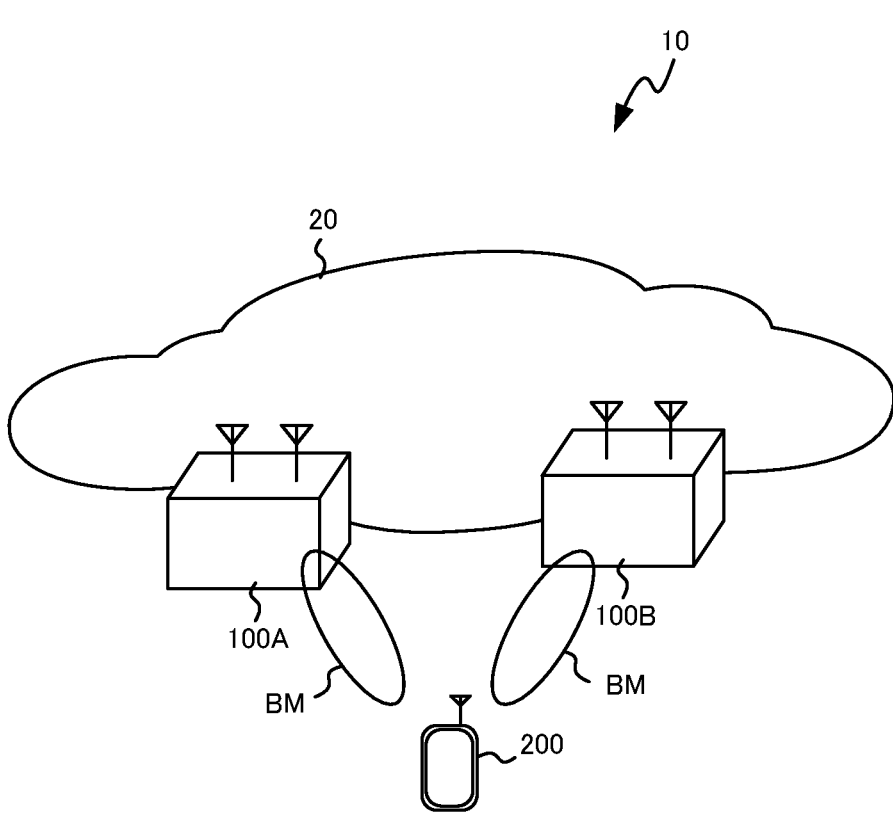
FIG. 1 is an overall schematic diagram of the radio communication system 10.

Exemplary embodiments of the present invention are explained below with reference to the accompanying drawings. The same functions and structures are denoted by the same or similar reference numerals, and their descriptions are omitted accordingly.

Embodiments (1) Overall Schematic Configuration of the Radio Communication System FIG. 1 is an overall schematic configuration diagram of the radio communication system 10 according to an embodiment. The radio communication system 10 is a radio communication system according to 5G New Radio (NR) and includes a Next Generation-Radio Access Network 20 (hereinafter referred to as NG-RAN20 and a terminal 200 (UE200).

The radio communication system 10 may be a radio communication system according to a system called Beyond 5G, 5G Evolution or 6G.

The NG-RAN20 includes a radio base station 100 A (gNB100 A) and a radio base station 100B (gNB100B). The specific configuration of the radio communication system 10 including the number of gNBs and UEs is not limited to the example shown in FIG. 1.

The NG-RAN20 actually includes a plurality of NG-RAN Nodes, specifically gNBs (or ng-eNBs), connected to a core network (5GC, not shown) according to 5G. Note that the NG-RAN20 and 5 GCs may be simply described as "networks".

The gNB100 A and gNB100B are radio base stations according to 5G, and perform radio communications according to the UE200 and 5G. The gNB100 A, gNB100B, and UE200 can support Massive MIMO (Multiple-Input Multiple-Output), which generates a more directional beam BM by controlling radio signals transmitted from multiple antenna elements; Carrier Aggregation (CA), which uses multiple component carriers (CCs) bundled together; and Dual Connectivity (DC), which communicates with two or more transport blocks simultaneously between the UE and each of two NG-RAN Nodes.

The radio communication system 10 also supports multiple frequency ranges (FRs). FIG. 2 shows the frequency ranges used in the radio communication system 10.

As shown in FIG. 2, the radio communication system 10 corresponds to FR1 and FR2. The frequency bands of each FR are as follows.

FR1:410 MHz~7.125 GHz ·FR2:24.25 GHz~52.6 GHz FR1 uses 15, 30 or 60 kHz sub-carrier spacing (SCS) and may use a 5~100 MHz bandwidth (BW). FR2 is higher frequency than FR1 and may use 60 or 120 kHz (may include 240 kHz) SCS and may use a 50~400 MHz bandwidth (BW).

SCS may be interpreted as numerology. Numerology is defined in 3GPP TS38.300 and corresponds to one subcarrier spacing in the frequency domain.

In addition, the radio communication system 10 corresponds to a higher frequency band than the FR2 frequency band. Specifically, the radio communication system 10 corresponds to a frequency band above 52.6 GHz and up to 71 GHz or 114.25 GHz. Such a high frequency band may be referred to as "FR 2 x" for convenience.

Since the influence of phase noise increases in the high frequency band, a cyclic prefix-orthogonal frequency division multiplexing (CP-OFDM)/discrete Fourier transform-spread (DFT-S-OFDM) with greater sub-carrier spacing (SCS) may be applied when a band greater than 52.6 GHz is used.

Figure 3:
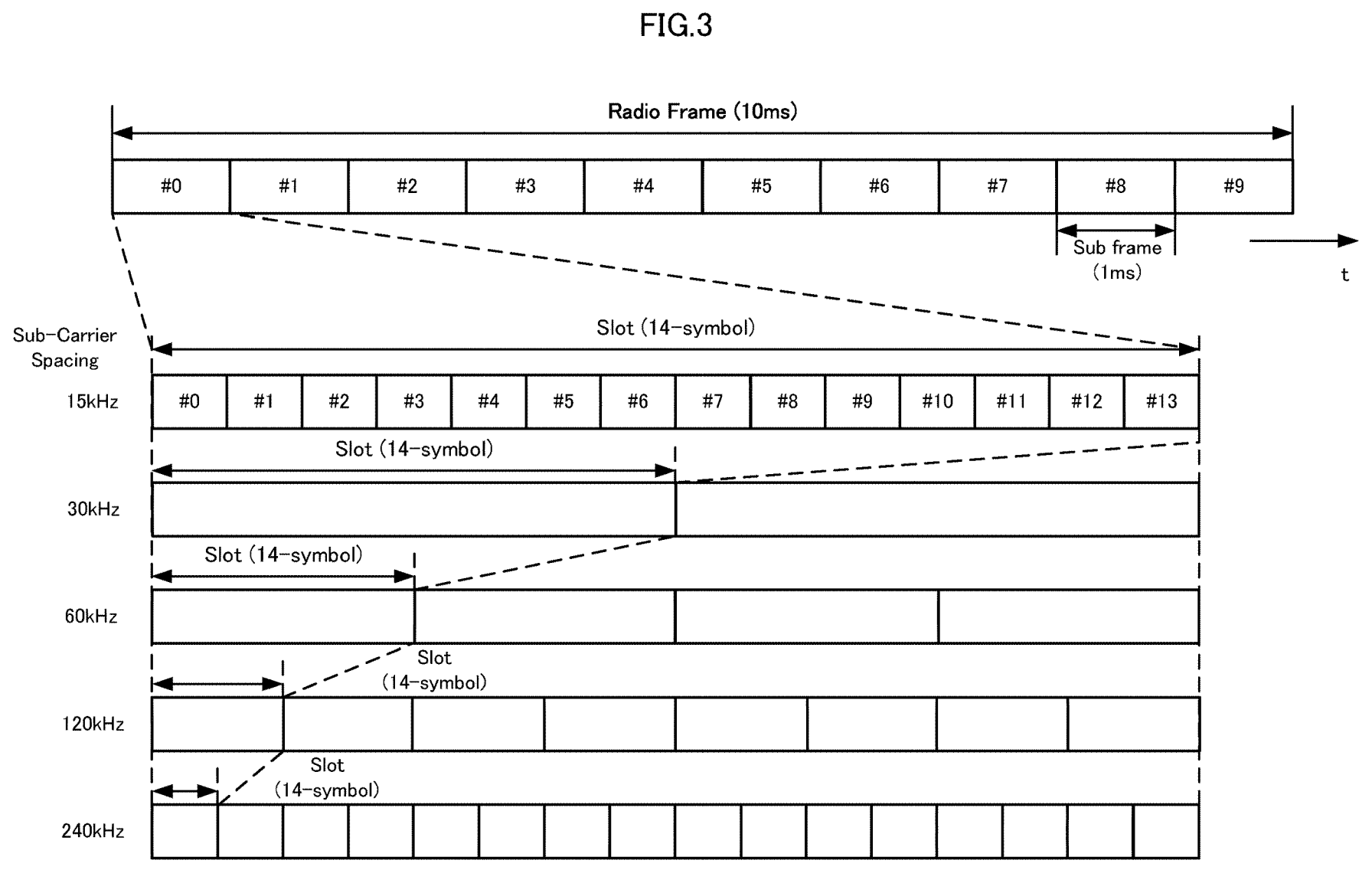

FIG. 3 shows a configuration example of a radio frame, sub-frame and slot used in the radio communication system 10.

As shown in FIG. 3, one slot is composed of 14 symbols, and the larger (wider) the SCS, the shorter the symbol period (and slot period). The SCS is not limited to the interval (frequency) shown in FIG. 3. For example, 480 kHz, 960 kHz, and the like may be used.

The number of symbols constituting 1 slot may not necessarily be 14 symbols (For example, 28, 56 symbols). Furthermore, the number of slots per subframe may vary depending on the SCS.

Note that the time direction (t) shown in FIG. 3 may be referred to as a time domain, symbol period, symbol time, etc. The frequency direction may be referred to as a frequency domain, resource block, subcarrier, bandwidth part (BWP), etc.

A DMRS is a type of reference signal and is prepared for various channels. In this context, unless otherwise specified, a DMRS for a downstream data channel, specifically a PDSCH (Physical Downlink Shared Channel), may be used. However, a DMRS for an upstream data channel, specifically a PUSCH (Physical Uplink Shared Channel), may be interpreted in the same way as a DMRS for a PDSCH.

The DMRS may be used for channel estimation in a device, e.g., UE200, as part of a coherent demodulation. The DMRS may be present only in the resource block (RB) used for PDSCH transmission.

The DMRS may have more than one mapping type. Specifically, the DMRS may have a mapping type A and a mapping type B. In a mapping type A, the first DMRS is located in the second or third symbol of the slot. In a mapping type A, the DMRS may be mapped relative to the slot boundary regardless of where the actual data transmission is initiated in the slot. The reason why the first DMRS is placed in the second or third symbol of the slot may be interpreted as placing the first DMRS after the control resource sets (CORESET).

In mapping type B, the first DMRS may be placed in the first symbol of the data allocation. That is, the location of the DMRS may be given relative to where the data is located, rather than relative to the slot boundary.

The DMRS may also have more than one type. Specifically, the DMRS may have Type 1 and Type 2. Type 1 and Type 2 differ in the maximum number of mapping and orthogonal reference signals in the frequency domain. Type 1 can output up to four orthogonal signals in single-symbol DMRS, and Type 2 can output up to eight orthogonal signals in double-symbol DMRS.

(2) Functional Block Configuration of Radio Communication System

Next, a functional block configuration of the radio communication system 10 will be described.

First, a functional block configuration of the UE200 will be described.

Figure 4:
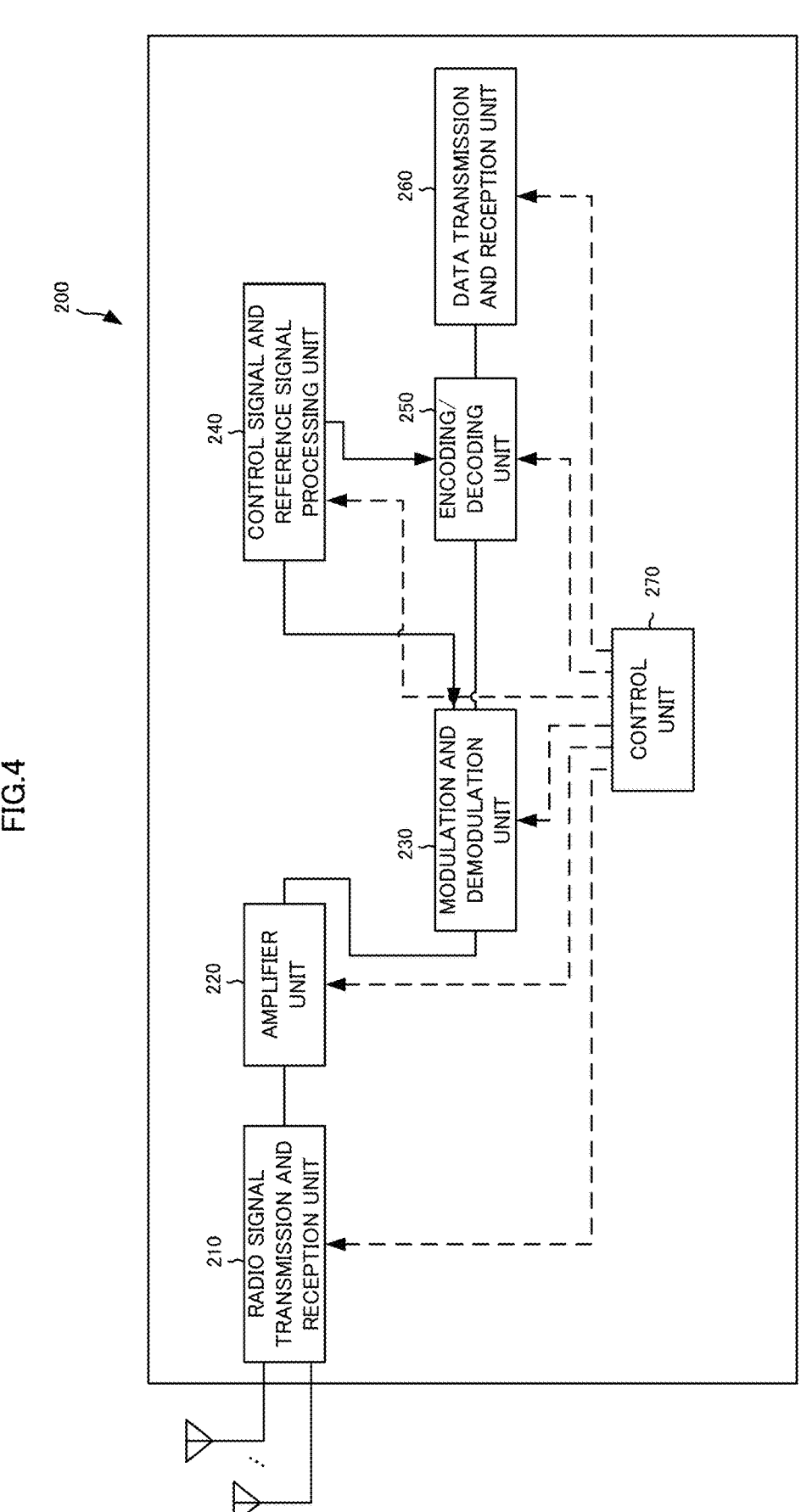
FIG. 4 shows a functional block configuration diagram of the UE200.

FIG. 4 is a functional block configuration diagram of the UE200. As shown in FIG. 4, the UE200 includes a radio signal transmission and reception unit 210, an amplifier unit 220, a modulation and demodulation unit 230, a control signal and reference signal processing unit 240, an encoding/decoding unit 250, a data transmission and reception unit 260, and a control unit 270.

The radio signal transmission and reception unit 210 transmits and receives radio signals in accordance with the NR. The radio signal transmission and reception unit 210 corresponds to a Massive MIMO, a CA using a plurality of CCs bundled together, and a DC that simultaneously communicates between a UE and each of two NG-RAN Nodes.

The amplifier unit 220 is composed of a PA (Power Amplifier)/LNA (Low Noise Amplifier) or the like. The amplifier unit 220 amplifies the signal output from the modulation and demodulation unit 230 to a predetermined power level. The amplifier unit 220 also amplifies the RF signal output from the radio signal transmission and reception unit 210.

The modulation and demodulation unit 230 performs data modulation/demodulation, transmission power setting, resource block allocation, etc. for each predetermined communication destination (gNB100 or other gNB). In the modulation and demodulation unit 230, Cyclic Prefix-Orthogonal Frequency Division Multiplexing (CP-OFDM)/Discrete Fourier Transform-Spread (DFT-S-OFDM) may be applied. DFT-S-OFDM may be used not only for the uplink (UL) but also for the downlink (DL).

The control signal and reference signal processing unit 240 performs processing related to various control signals transmitted and received by the UE200 and various reference signals transmitted and received by the UE200.

Specifically, the control signal and reference signal processing unit 240 receives various control signals transmitted from the gNB100 via a predetermined control channel, for example, a radio resource control layer (RRC) control signal. The control signal and reference signal processing unit 240 also transmits various control signals to the gNB100 via a predetermined control channel.

The control signal and reference signal processing unit 240 executes processing using a reference signal (RS) such as a demodulation reference signal (DMRS) and a phase tracking reference signal (PTRS).

The DMRS is a known reference signal (pilot signal) between a base station and a terminal of each terminal for estimating a fading channel used for data demodulation. The PTRS is a reference signal of each terminal for estimating phase noise, which is a problem in a high frequency band.

In addition to the DMRS and the PTRS, the reference signal may include a Channel State Information-Reference Signal (CSI-RS), a Sounding Reference Signal (SRS), and a Positioning Reference Signal (PRS) for position information.

The channel may include a control channel and a data channel. The control channel may include PDCCH (Physical Downlink Control Channel), PUCCH (Physical Uplink Control Channel), RACH (Random Access Channel), Downlink Control Information (DCI) including Random Access Radio Network Temporary Identifier (RA-RNTI), and Physical Broadcast Channel (PBCH).

The data channel may also include PDSCH (Physical Downlink Shared Channel) and PUSCH (Physical Uplink Shared Channel). Data means data transmitted over a data channel. The data channel may be read as a shared channel.

Here, the control signal and reference signal processing unit 240 may receive downlink control information (DCI). The DCI includes existing fields for storing DCI Formats, Carrier indicator (CI), BWP indicator, Frequency Domain Resource Allocation (FDRA), Time Domain Resource Allocation (TDRA), Modulation and Coding Scheme (MCS), HPN (HARQ Process Number), New Data Indicator (NDI), Redundancy Version (RV), and the like.

The value stored in the DCI Format field is an information element that specifies the format of the DCI. The value stored in the CI field is an information element that specifies the CC to which the DCI applies. The value stored in the BWP indicator field is an information element that specifies the BWP to which the DCI applies. The BWP that can be specified by the BWP indicator is set by an information element (BandwidthPart-Config) contained in the RRC message. The value stored in the FDRA field is an information element that specifies the frequency domain resource to which the DCI applies. The frequency domain resource is specified by the value stored in the FDRA field and the information element (RA Type) contained in the RRC message. The value stored in the TDRA field is the information element that specifies the time domain resource to which the DCI is applied. The time domain resource is specified by the value stored in the TDRA field and the information element (pdsch-TimeDomainAllocationList, pusch-TimeDomainAllocationList) contained in the RRC message. The time domain resource may be specified by the value stored in the TDRA field and the default table. The value stored in the MCS field is an information element that specifies the MCS to which the DCI applies. The MCS is specified by the value stored in the MCS and the MCS table. The MCS table may be specified by an RRC message or specified by RNTI scrambling. The value stored in the HPN field is an information element that specifies the HARQ Process to which the DCI is applied. The value stored in the NDI is an information element that identifies whether the data to which the DCI is applied is first-time data. The value stored in the RV field is an information element that specifies the redundancy of the data to which the DCI is applied.

The encoding/decoding unit 250 performs data partitioning/concatenation and channel coding/decoding for each predetermined communication destination (gNB100 or other gNB).

Specifically, the encoding/decoding unit 250 divides the data output from the data transmission and reception unit 260 into predetermined sizes and performs channel coding for the divided data. The encoding/decoding unit 250 decodes the data output from the modulation and demodulation unit 230 and concatenates the decoded data.

The data transmission and reception unit 260 transmits and receives the protocol data unit (PDU) and the service data unit (SDU). Specifically, the data transmission and reception unit 260 performs assembly/disassembly of the PDU/SDU in a plurality of layers (Media access control layer (MAC), radio link control layer (RLC), packet data convergence protocol layer (PDCP), etc.). The data transmission and reception unit 260 also performs error correction and retransmission control of data based on HARQ (Hybrid Automatic Repeat Request).

The control unit 270 controls each function block constituting the UE200. In the embodiment, the control unit 270 constitutes a control unit that applies a target subcarrier spacing (herein after target SCS) lower than a specific subcarrier spacing (hereinafter specific SCS) in a target frequency band, the target frequency band includes at least a part of a specific frequency range defined with the specific subcarrier spacing as a minimum subcarrier spacing (hereinafter minimum SCS) or a frequency band lower than the specific frequency range. The control unit 270 applies a method different from an initial access method related to the specific SCS, for at least a part of an initial access method related to the target SCS. The frequency use efficiency of the target SCS may be higher than that of the specific SCS.

For example, the specific frequency range may be FR1 as described above. In such a case, the specific SCS may be 15 kHz. The target frequency band may include at least a portion of FR1. The target frequency band may include a frequency band lower than FR1. The target SCS may be an SCS (For example, 7.5 kHz, 3.75 kHz, 1.875 kHz, etc.) that satisfies the ½n condition of the specific SCS (For example, 15 kHz), where n is a positive integer, or an SCS that does not satisfy the ½n condition of the specific SCS.

Second, the functional block configuration of the gNB100 will be described.

Figure 5:
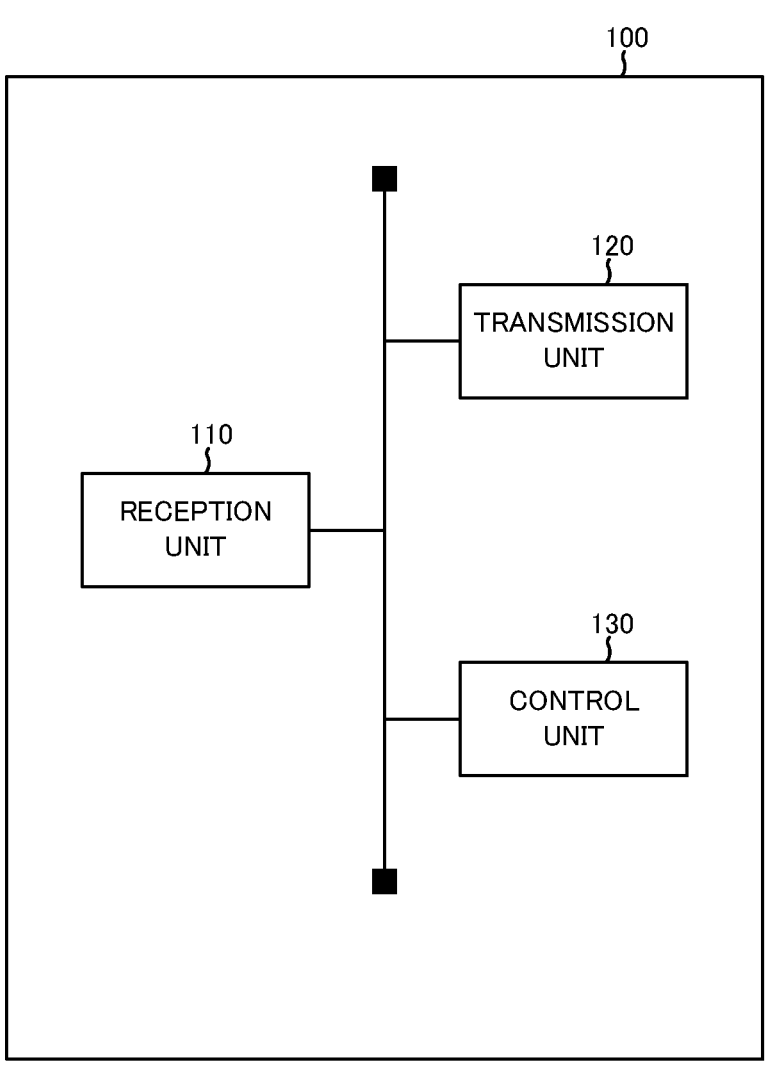
FIG. 5 shows a functional block configuration diagram of the gNB100.

FIG. 5 is a functional block configuration diagram of the gNB100. As shown in FIG. 5, the gNB100 has a reception unit 110, a transmission unit 120, and a control unit 130.

The reception unit 110 receives various signals from the UE200. The reception unit 110 may receive UL signals via PUCCH or PUSCH.

The transmission unit 120 transmits various signals to the UE200. The transmission unit 120 may transmit DL signals via PDCCH or PDSCH.

The control unit 130 controls gNB100. In embodiments, the control unit 130 constitutes a control unit that applies the target SCS lower than the specific SCS in the target frequency band, the target frequency band includes at least a part of the specific frequency range defined with the specific subcarrier spacing as the minimum SCS or the frequency band lower than the specific frequency range. The control unit 130 applies a method different from an initial access method related to the specific SCS, for at least a part of an initial access method related to the target SCS. The frequency use efficiency of the target SCS may be higher than that of the specific SCS.

(3) Background

The background of the embodiment will be described below. The CBW (Channel Bandwidth) will be described below.

Figure 6:
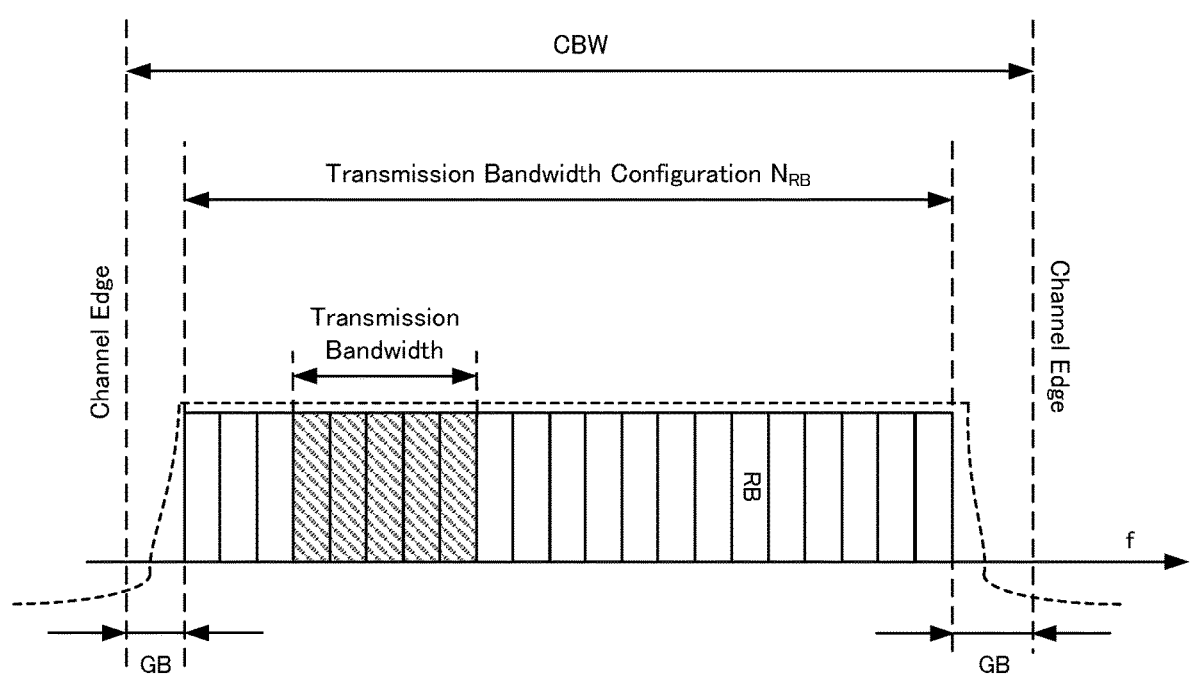
FIG. 6 shows a background diagram.

Specifically, as shown in FIG. 6, a guard band (GB) is provided at both ends of the CBW, and a band excluding the GB in the CBW is a band that can be used for transmission. Such a band is set by the number of resource blocks (RBs) (Transmission Bandwidth Configuration $N_{RB}$ in FIG. 6). The active transmission bandwidth (RB) used for actual transmission is set from among the transmission bandwidth configuration NRBS. The transmission bandwidth may be referred to as the bandwidth part (BWP).

First, in the existing scheme, the ratio of the cyclic prefix length (CP Ratio) is the same regardless of the SCS. For example, the CP ratio of Normal CP (hereinafter, NCP) is 144 (160)/2048 (approximately 6.6%). The CP ratio of Extended CP is 512/2048 (20%).

Second, in the existing scheme, the higher the SCS, the larger the GB and the more bandwidth is unavailable within the CBW. For example, if the CBW is 50 MHz, the available bandwidth within the CBW is as follows: For a 15 kHz SCS, the available bandwidth is 48.6 MHz (=270RB*12SC (Subcarrier)*15 kHz) and the percentage of available bandwidth is 97.2% (48.6 MHz/50 MHz). For a 30 kHz SCS, the available bandwidth is 47.88 MHz (=133RB*12SC*30 kHz) and the percentage of available bandwidth is 95.76% (47.88 MHz/50 MHz). For a 60 kHz SCS, the available bandwidth is 46.8 (47.52) MHz (=65RB*12SC*60 kHz) and the percentage of available bandwidth is 93.6 (95.04)% (46.8 (47.52) MHz/50 MHz). For a 120 kHz SCS, the available bandwidth is 46.08 MHz (=32RB*12SC*30 kHz) and the percentage of available bandwidth is 92.16% (46.08 MHz/50 MHz).

Third, the existing mechanism specifies a CBW limit for each SCS. For example, for a 15 kHz SCS, the CBW limit is 50 MHz.

Against this background, the inventors, etc. have found, as a result of careful examination, that the frequency utilization efficiency can be improved by introducing a SCS lower than the specific SCS specified in FR1 (For example, 15 kHz) in the target frequency band including at least a part of the specific frequency range (For example, FR1) or a frequency band lower than the specific frequency range.

(4) Assumed Case

The assumed case of the embodiment will be described below. The case in which the specific frequency range is FR1, the specific SCS is 15 kHz, and the target SCS is 7.5 kHz will be illustrated below. In the assumed case, the case in which a 7.5 kHz SCS is introduced in the target frequency band including at least a part of FR1 or a frequency band lower than FR1 will be illustrated.

However, the target SCS may be an SCS (For example, 7.5 kHz, 3.75 kHz, 1.875 kHz, etc.) which satisfies the condition of $\frac{1}{2}^n$ (n is a positive integer) of the specific SCS (For example, 15 kHz), and may also be an SCS which does not satisfy the condition of $\frac{1}{2}^n$ of the specific SCS.

(4.1) CP Ratio

The ratio of the cyclic prefix length used in the target SCS (7.5 kHz) (CP Ratio) may be lower than the ratio of the cyclic prefix length used in the specific SCS (15 kHz) (CP Ratio of NCP).

Here, the delay spread resolved by the CP does not depend on the SCS, but is determined by the frequency band and station scenario. Therefore, even if the CP ratio applied to the target SCS is lower than the CP ratio of the existing NCP, the delay spread can be appropriately resolved and the frequency utilization efficiency can be enhanced.

(4.2) Number of FFT Points

The number of FFT (Fast Fourier Transform) points used in the target SCS may be larger than the number of FFT points used in the specific SCS. For example, the number of FFT points used in the target SCS may be 8192 while the number of FFT points used in the specific SCS is 4096.

With such a configuration, even when a SCS lower than the specific SCS (For example, 15 kHz) defined in FR1 is introduced, a broadband CBW can be used as the CBW, thereby enhancing the frequency utilization efficiency. In addition, since a broadband CBW can be used as the CBW, it may be possible to suppress the increase in the number of CCs in the CA.

As the number of RBs per BW, a value larger than the maximum number of RBs (For example, 273) in the specific SCS may be supported. In such a case, an FDRA field containing more bits than the number of existing bits may be newly defined. Alternatively, the bits may be interpreted as if the granularity of the frequency resource represented by the bits contained in the FDRA field is less than the existing granularity without changing the number of bits in the FDRA field from the number of existing bits. Alternatively, a table and/or frequency resource allocation method defining the allocation of frequency resources to be applied to the target SCS may be predefined in the radio communication system 10.

The gNB100 may support a number of FFT points greater than the number of FFT points used in the specific SCS, and the UE200 may not support a number of FFT points greater than the number of FFT points used in the specific SCS. In such a case, the UE200 may not assume that the BWP of the target SCS is allocated across the CBW supported by the gNB100. If the UE200 supports a number of FFT points greater than the number of FFT points used in the specific SCS, the information may be reported to the gNB100.

(4.3) Conditions of Application

Conditions for applying the target subcarrier spacing may be specified. The conditions may include conditions for applying the target subcarrier spacing, such as band, frequency range, duplex mode, and Serving Cell type. For example, the conditions may include conditions for applying the target subcarrier spacing to the BWP of the SCell (Secondary Cell).

(4.4) UE Capability

UE Capability may be defined to indicate implicitly or explicitly whether the UE200 corresponds to the target subcarrier spacing. For example, a terminal type such as IoT terminal (reduced capability), IAB (IAB-MT)-MT (Mobile Termination), or FWA (Fixed Wireless Access) terminal may indicate implicitly whether the UE200 corresponds to the target subcarrier spacing. Other information elements included in the UE Capability may indicate implicitly whether the UE200 corresponds to the target subcarrier spacing.

(4.5) Symbol Boundary

Figure 7:
FIG. 7 shows a symbol boundary diagram.

The symbol boundary of the specific SCS may meet the symbol boundary of the target SCS at a particular time interval. The particular time interval may be 0.5 ms or 1.0 ms. For example, a case in which 8 symbols are included as symbols of the target SCS in a time interval corresponding to 1Slot (14-Symbol) of the specific SCS is illustrated. The 8 symbols are realized by the fact that the CP Ratio is lower than the CP Ratio of the NPC. It should be noted that if the CP Ratio is the same as the CP Ratio of the NPC, the 7 symbols are included as symbols of the target SCS in the time interval corresponding to 1Slot (14-Symbol) of the specific SCS. Under these assumptions, the symbol boundaries may be defined as follows:

First, as shown in FIG. 7, the symbol boundaries of the specific SCS (15 kHz) and the target SCS (7.5 kHz) may meet every 0.5 ms (That is, the four symbols of the target SCS). That is, the head position of symbol #0 of the specific SCS and the head position of symbol #0 of the target SCS may be aligned, and the head position of symbol #7 of the specific SCS and the head position of symbol #4 of the target SCS may be aligned. In the case shown in FIG. 7, since the number of symbols of the target SCS included in the time interval corresponding to 1Slot (14-Symbol) of the specific SCS must be an even number, the CP Ratio must be lower than the CP Ratio of the NPC.

Figure 8:
FIG. 8 shows a symbol boundary diagram.

Second, as shown in FIG. 8, the symbol boundary of the specific SCS (15 kHz) and the symbol boundary of the target SCS (7.5 kHz) may meet every 1.0 ms (That is, eight symbols of the target SCS). That is, the head position of symbol #0 of the specific SCS and the head position of symbol #0 of the target SCS may be aligned, but the head position of symbol #7 of the specific SCS and the head position of symbol #4 of the target SCS may not be aligned. In the case shown in FIG. 8, since the number of symbols of the target SCS included in the time interval corresponding to 1Slot (14-Symbol) of the specific SCS need not be even, the CP Ratio may not be lower than the CP Ratio of the NPC.

Although the case in which the symbol boundary of the specific SCS and the symbol boundary of the target SCS coincide in the time interval of 1Slot or less of the specific SCS is illustrated here, the embodiment is not limited thereto. The symbol boundary of the specific SCS and the symbol boundary of the target SCS may coincide in the time interval longer than 1Slot of the specific SCS.

(4.6) UE Processing Timeline

A new time may be defined as the UE Processing timeline when the target SCS is applied. Alternatively, the UE Processing timeline used in the specific SCS may be used as the UE Processing timeline when the target SCS is applied.

The UE Processing timeline may include one or more Processing timelines selected from among PDSCH processing timeline (N1), PUSCH processing timeline (N2), HARQ-ACK multiplexing timeline (N3), CSI processing time (Z1, Z2, Z3), BWP switching delay, Beam switching delay, minimum gap for scheduling, and minimum gap for triggering.

It should be noted here that in the prior art, a longer absolute time is defined as the Processing timeline as the SCS is lower. The embodiment focuses on the possibility that a longer absolute time may not be necessary to define the Processing timeline when the target SCS is applied. This possibility is based on the evolution of device performance.

(4.7) RS (Reference Signal)

When the target SCS is applied, new resource locations, densities and configuration parameters may be defined as the resource locations, densities and configuration parameters of the RS.

Specifically, because the target SCS is lower than the specific SCS, the insertion density of the RS in the frequency direction for the target SCS may be lower than the insertion density of the RS in the frequency direction for the specific SCS. Because the symbol length of the target SCS is longer than the symbol length of the specific SCS, the insertion density of the RS in the time direction for the target SCS may be higher than the insertion density of the RS in the time direction for the specific SCS.

For example, a new type having a lower insertion density of the DMRS in the frequency direction than the existing technology may be defined as the configuration type of the DMRS to be set when the target SCS is applied. Alternatively, a PTRS having a lower insertion density in the frequency direction than the existing technology may be defined as the PTRS to be set when the target SCS is applied.

(4.8) Number of Symbols

The number of symbols included in one Slot of the target SCS may be different from the number of symbols included in one Slot of the specific SCS (For example, 14). This is because it is necessary to define one Slot of the target SCS and the number of symbols included in one Slot of the target SCS by lowering the CP Ratio applied to the target SCS.

For example, if one Slot is defined as 2 ms, 16 or 15 symbols may be included in 2 ms. If one Slot is defined as 1 ms, 8 symbols may be included in 1 ms. If one Slot is defined as 0.5 ms, 4 symbols may be included in 0.5 ms.

In such a case, a TDRA field containing more bits than the number of existing bits may be newly defined. Alternatively, without changing the number of bits in the TDRA field from the number of existing bits, the bits may be interpreted as if the granularity of the frequency resource represented by the bits contained in the TDRA field is smaller than the existing granularity. Alternatively, a table and/or time resource allocation method defining the allocation of time resources to be applied to the target SCS may be predefined in the radio communication system 10.

DL, FL and UL may be configurable for symbols included in the target SCS. DL means symbols used for DL, UL means symbols used for UL, and FL means symbols used for either DL or UL. DL, FL, and UL may be set by RRC parameters, some of which (e.g., symbols designated FL by RRC) may be updated by DCI or MAC CE.

A new Slot format may be defined as the Slot format used by the target SCS. Alternatively, the Slot format used by the target SCS may be specified by a change in the interpretation of the existing Slot format. The Slot format specified in Table 11.1.1-1 of 3GPP T538.213 V 16.4.0 may be used as the existing Slot format. For example, if 1Slot of the target SCS contains less than 14 symbols, a portion of the existing Slot format may be extracted. If 1Slot of the target SCS contains more than 14 symbols, additional symbols may be inserted into the existing Slot format. The type of additional symbol (DL, FL, UL) may be specified by a parameter that is notified separately from the existing Slot format, or by the type of symbol contained in the existing Slot format.

(5) Initial Access Method

The initial access method for the target SCS will be described below. As described above, at least a part of the initial access method for the target SCS differs from the initial access method for the target SCS.

(5.1) First Method

In the first method, a case in which the target SCS is not supported as the SCS of the synchronization signal/PBCH block (SSB) will be described. The SSB is an example of a synchronization signal and includes a master information block (MIB). That is, an existing SSB is used in the initial access method of the target SCS. Therefore, when the BWP of the target SCS is set as the active BWP, the UE200 performs monitoring of the SSB existing in the band other than the active BWP using the measurement gap.

In such a case, the following options can be considered.

Option 1 does not support the target SCS as the SCS for CORESET #0. CORESET #0 is an example of a control resource set that is used to schedule System Information Block (SIB) 1. In Option 1, UE200 performs initial access using SSB/CORESET #0 of the existing SCS (For example, the specific SCS). UE200 may perform Measurement, Automatic Neighbor Relation (ANR), etc. using SSB/CORESET #0 of the existing SCS. In other words, UE200 does not assume to perform operations such as initial access using the target SCS.

Option 2 supports the target SCS as the SCS for CORESET #0. In Option 2, the UE200 may recognize that the target SCS is supported as the SCS for CORESET #0 based on the information elements contained in the MIB when it detects an SSB for an existing SCS (For example, the specific SCS). In such a case, the specific information elements contained in the MIB may be read. The read may be performed in a specific frequency band or a specific band. The specific information element may be one or more information elements selected from systemFrameNumber, subCarrierSpacingCommon, pdcch-ConfigSIB1, cellBarred, and spare, or other information elements.

For example, if the specific information element is systemFrameNumber, the UE200 may recognize that the target SCS is supported as an SCS for CORESET #0 by an information element (part of systemFrameNumber) that represents part of the SFN that is not used, assuming that part of the SFN of the radio frame is not used. In other words, part of systemFrameNumber is read as an information element that indicates whether the target SCS is supported as an SCS for CORESET #0.

Alternatively, if the specific information element is cellBarred, UE200 may recognize that the target SCS is supported as an SCS for CORESET #0 by cellBarred, assuming that cellBarred does not represent whether the cell is prohibited. In other words, cellBarred is read as an information element indicating whether the target SCS is supported as the SCS of CORESET #0. In such a case, UE200 may determine whether the use of the cell is prohibited based on the information element contained in SIB'.

In option 3, the target SCS is not supported as the SCS of CORESET #0, but SIB' may contain an information element indicating whether the target SCS is supported as the SCS of the initial DL/UL BWP. In such a case, apart from the information element indicating that the SCS of the initial DL/UL BWP is the target SCS, the information element indicating that the SCS of the initial DL/UL BWP is an existing SCS (For example, the specific SCS) may be notified. The information element indicating that the SCS of the initial DL/UL BWP is an existing SCS may be considered as an information element used by the UE200 which does not correspond to the target SCS. The UE200 which does not correspond to the target SCS may perform selection of other cells or other frequencies when the information element indicating that the SCS of the initial DL/UL BWP is the target SCS is notified. The UE200 which does not correspond to the target SCS may perform selection of other cells or other frequencies when the information element indicating that the SCS of the initial DL/UL BWP is the existing SCS is not notified.

(5.2) Second Method

In the second method, a case in which the target SCS is supported as the SCS of the synchronization signal/PBCH block (SSB) will be described. The SSB is an example of a synchronization signal and includes a MIB. That is, the SSB used in the target SCS is used in the initial access method of the target SCS.

In such a case, the mapping pattern obtained by scaling the mapping pattern of the SSB used in the existing SCS (For example, the specific SCS) to be used in the target SCS may be used as the mapping pattern of the SSB used in the target SCS. As the mapping pattern of the SSB used in the existing SCS, Case A or Case B specified in § 4.1 of 3GPP TS38.213 V 16.4.0 may be used. Alternatively, as the mapping pattern of the SSB used in the target SCS, a new mapping pattern may be defined.

The SSB used in the target SCS may not be multiplexed with CORESET #0 of the existing SCS (For example, the specific SCS). In other words, the SSB used in the target SCS may be multiplexed with CORESET #0 of the target SCS. Alternatively, at least a portion of the SSB used in the target SCS may be multiplexed with at least a portion of CORESET #0 of the existing SCS. If multiplexing of the SSB used in the target SCS with CORESET #0 of the existing SCS is permitted, only multiplexing of CORESET #0 of the existing SCS closest to the target SCS may be permitted.

In such a case, the following options may be considered.

In option 1, the SSB used in the target SCS is not assumed to be used in the initial access for the target SCS. In option 1, the UE200 may perform monitoring of the SSB used in the target SCS when explicitly instructed to search for the SSB used in the target SCS. The information element that instructs the search for the SSB used in the target SCS may be MeasObjectNR.

Option 2 assumes the use of the SSB used in the target SCS in the initial access for the target SCS. In option 2, the UE200 may perform monitoring of the SSB used in the target SCS in a specific frequency band or band. The interval between the synchronization rasters searching for the SSB used in the target SCS may be wider than the interval between the frequency rasters searching for the SSB used in the existing SCS (For example, the specific SCS).

(6) Actions and Effects

In embodiments, UE200 and gNB100 apply the target SCS lower than the specific SCS in a target frequency band that includes at least a portion of FR1 or a frequency band lower than FR1 for which the specific SCS (minimum SCS) is defined. UE200 and gNB100 apply a method different from the initial access method for the specific SCS as at least part of the initial access method for the target SCS. With such a configuration, the initial access for the target SCS can be properly executed when the target SCS is newly introduced to enhance the frequency utilization efficiency.

(7) Modification Example 1

A modification example 1 of the embodiment will be described below. In the following, the differences between the embodiments will be mainly described.

In the embodiment, the case where the specific frequency range is FR1, the specific SCS is 15 kHz, and the target frequency band includes at least a part of FR1 or a frequency band lower than FR1 has been described. In contrast, in the modified example 1, the case where the specific frequency range is FR2, the specific SCS is 60 kHz, and the target frequency band includes at least a part of FR2 or a frequency band lower than FR2 will be described.

In the modified example 1, the target SCS may be an SCS (For example, 30 kHz, 15 kHz, etc.) that satisfies the $\frac{1}{2}^n$ (n is a positive integer) condition of the specific SCS (For example, 60 kHz), and may also be an SCS that does not satisfy the $\frac{1}{2}^n$ condition of the specific SCS. Even in such a case, at least one of the first method and the second method described above may be applied.

Similar to the embodiment, when the target SCS is supported as the SCS of the SSB, the mapping pattern of the SSB used in the target SCS may be the existing mapping pattern of the SSB (For example, Case A through Case Cas specified in § 4.1 of 3GPP TS38.213 V 16.4.0) as it is, or the mapping pattern obtained by scaling the mapping pattern of the existing SSB (For example, Case D through Case E as specified in § 4.1 of 3GPP TS38.213 V 16.4.0) to be used in the target SCS may be used. Alternatively, a new mapping pattern may be defined as the mapping pattern of the SSB used in the target SCS.

The maximum number of SSBs in the target SCS may be less than the maximum number of SSBs in the existing SCS (For example, 64). In such a case, all SSB candidate positions for the SSBs in the target SCS may be defined to fall within the SSB transmission period (For example, 5 ms).

Alternatively, the maximum number of SSBs in the target SCS may be the same as the maximum number of SSBs in the existing SCS (For example, 64). In such a case, all SSB candidate positions for the SSBs in the target SCS may be defined to fall within a period longer than the existing SSB transmission period (For example, 5 ms). That is, the SSB transmission period of 5 ms may not be supported, and the SMTC window duration may be longer than the existing SSB transmission period (For example, 5 ms).

One or more configurations selected from the aforementioned (4.1) CP Ratio, (4.2) number of FFT points, (4.3) application conditions, (4.4) UE capability, (4.5) symbol boundary, (4.6) UE Processing timeline, (4.7) RS, and (4.8) number of symbols may be applied.

Under these assumptions, if an SCS applicable to FR1 (15 kHz, 30 kHz) is used as the target SCS, a configuration similar to the SCS applicable to FR1 may be applied. Alternatively, even if an SCS applicable to FR1 (15 kHz, 30 kHz) is used as the target SCS, a configuration different from the SCS applicable to FR1 (at least one of (4.1) to (4.8) described above) may be applied.

(8) Modified Example 2

The modified example 2 of the embodiment will be described below. The differences between the embodiments will be mainly described below.

In the modified example 2, the case where the target SCS is supported as the SCS of the SSB or CORESET #0 will be further described.

In such a case, the CORESET #0 configuration may be newly defined. The first CORESET #0 configuration may be newly defined when the target SCS is supported as the SCS for both SSB and PDSCH. A second CORESET #0 configuration may be newly defined if the target SCS is supported as one of SSB and PDSCH. Both the first CORESET #0 configuration and the second CORESET #0 configuration may be defined.

The first CORESET #0 configuration or the second CORESET #0 configuration may differ from the CORESET #0 configuration of an existing SCS used in the same frequency band as the target SCS in the following parameters. The parameter may be one or more parameters selected from among multiplexing pattern, CORESET #0 number of RBs, and RB Offset. For example, in FR1, the multiplexing pattern of the first CORESET #0 configuration or the second CORESET #0 configuration may contain a value larger than the existing value (For example, $\frac{2}{3}$). In FR1, the number of CORESET #0RBs of the first CORE-SET #0 configuration or the second CORESET #0 configuration may contain a value larger than the existing value (For example, 96).

In addition, the Search Space Zero configuration may be newly defined. If the target SCS is supported as the SCS for both SSB and PDSCH, the first Search Space Zero configuration may be newly defined. A second Search Space Zero configuration may be newly defined if the target SCS is supported as one of SSB and PDSCH. Both the first Search Space Zero configuration and the second Search Space Zero configuration may be defined.

The first Search Space Zero configuration or the second Search Space Zero configuration may have different parameters as described below compared to the Search Space Zero configuration of an existing SCS used in the same frequency band as the target SCS. The parameter may be one or more parameters selected from among Number of search space sets per slot, M, and O. For example, the Number of search space sets per slot and M of the first Search Space Zero configuration or the second Search Space Zero configuration may be limited to 1. O of the first Search Space Zero configuration or the second Search Space Zero configuration may include a new value (Values other than 0, 2, 5, 7).

(9) Other Embodiments

Although the contents of the present invention have been described in accordance with the above embodiments, it is obvious to those skilled in the art that the present invention is not limited to these descriptions but can be modified and improved in various ways.

In the embodiment, terms such as specific SCS, specific frequency range, target frequency band, and target SCS have been used. However, the embodiment is not limited thereto. "Specific" may be read as "First" and "Target" may be read as "Second." Alternatively, "Specific" may be read as "Existing" and "Target" may be read as "New." Alternatively, "Target" may be read as "Low."

In embodiments, the initial access method for the target SCS differs from the initial access method for the specific SCS in at least one of support for SSBs and support for CORESET #0. The manner in which the initial access method for the target SCS differs from the initial access method for the specific SCS may include a manner in which the configuration of the SSB is different and a manner in which the configuration of CORESET #0 is different.

FIG. 4 and FIG. 5 show blocks of functional units. Those functional blocks (structural components) can be realized by a desired combination of at least one of hardware and software. Means for realizing each functional block is not particularly limited. That is, each functional block may be implemented using a single device that is physically or logically coupled, or two or more devices that are physically or logically separated may be directly or indirectly (For example, using wire, wireless, etc.) connected and implemented using these multiple devices. The functional block may be implemented using the single device or the multiple devices combined with software.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, the functional block (component) that functions transmission is called a transmission unit (transmitting unit) or a transmitter. As described above, the method of realization of both is not particularly limited.

Figure 9:
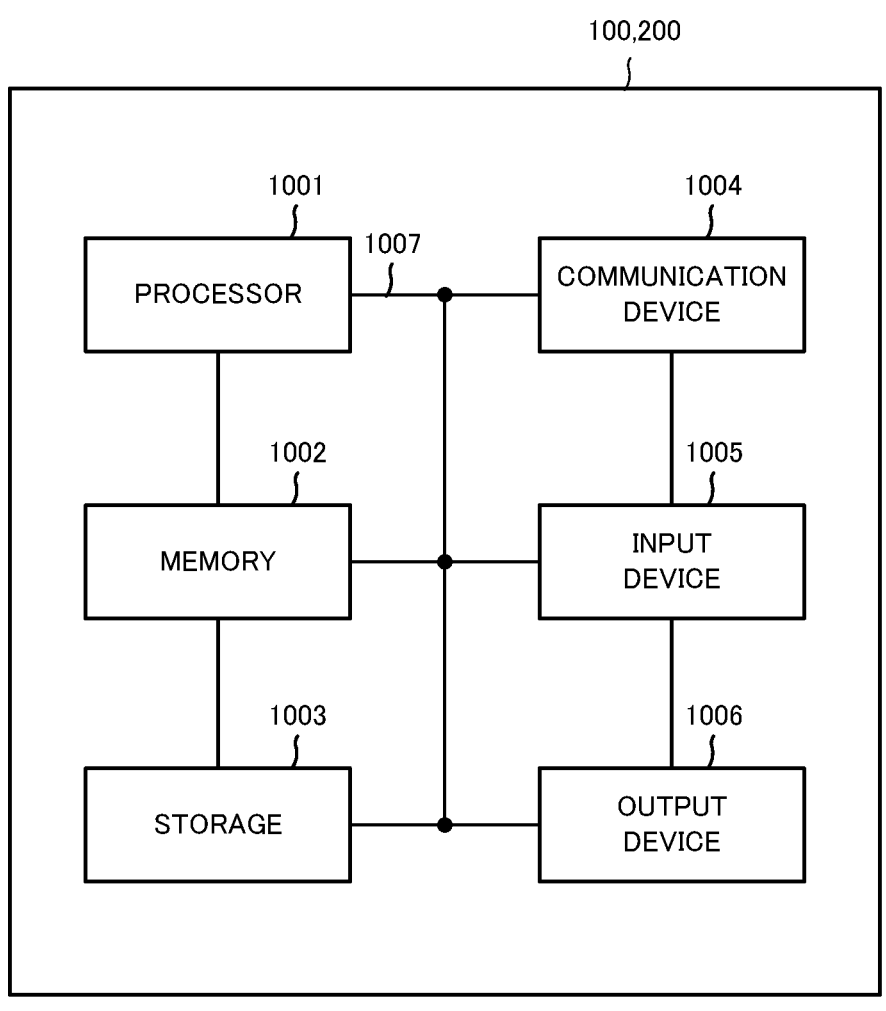
FIG. 9 shows an example of a hardware configuration of the gNB100 and the UE200.

In addition, the above-mentioned gNB100 and UE200 (the device) may function as a computer for processing the radio communication method of the present disclosure. FIG. 9 is a diagram showing an example of a hardware configuration of the device. As shown in FIG. 9, the device may be configured as a computer device including a processor 1001, a memory 1002, a storage 1003, a communication device 1004, an input device 1005, an output device 1006 and a bus 1007.

Furthermore, in the following explanation, the term "device" can be replaced with a circuit, device, unit, and the like. The hardware configuration of the device may be configured to include one or more of the devices shown or may be configured without some of the devices.

Each functional block of the device (see FIG. 4) is implemented by any hardware element of the computer device or a combination of the hardware elements.

Moreover, the processor 1001 performs computing by loading a predetermined software (computer program) on hardware such as the processor 1001 and the memory 1002, and realizes various functions of the reference device by controlling communication via the communication device 1004, and controlling reading and/or writing of data on the memory 1002 and the storage 1003.

Processor 1001, for example, operates an operating system to control the entire computer. Processor 1001 may be configured with a central processing unit (CPU), including interfaces to peripheral devices, controls, computing devices, registers, etc.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. In addition, the various processes described above may be performed by one processor 1001 or may be performed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 may be referred to as a register, cache, main memory (main storage device), or the like. The memory 1002 may store a program (program code), a software module, or the like capable of executing a method according to an embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Each device, such as the processor 1001 and the memory 1002, is connected by a bus 1007 for communicating information. The bus 1007 may be configured using a single bus or a different bus for each device.

In addition, the device may be configured to include hardware such as a microprocessor, a digital signal processor (DSP), an application specific integrated circuit (ASIC), a programmable logic device (PLD), a field programmable gate array (FPGA), etc., which may provide some or all of each functional block. For example, the processor 1001 may be implemented by using at least one of these hardware.

The notification of information is not limited to the aspects/embodiments described in the present disclosure and may be carried out using other methods. For example, the notification of information may be performed by physical layer signaling (e.g., Downlink Control Information (DCI), Uplink Control Information (UCI), higher layer signaling (e.g., RRC signaling, Medium Access Control (MAC) signaling, Notification Information (Master Information Block (MIB), System Information Block (SIB)), other signals, or a combination thereof. RRC signaling may also be referred to as RRC messages, e.g., RRC Connection Setup messages, RRC Connection Reconfiguration messages, etc.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing steps, sequences, flowcharts, etc., of the embodiments/embodiments described in the present disclosure may be reordered as long as there is no conflict. For example, the method described in the present disclosure presents the elements of the various steps using an exemplary sequence and is not limited to the particular sequence presented.

The specific operation that is performed by the base station in the present disclosure may be performed by its upper node in some cases. It is apparent that in a network consisting of one or more network nodes having a base station, the various operations performed for communication with the terminal may be performed by at least one of the base station and other network nodes (Examples include, but are not limited to, MME or S-GW.) other than the base station. In the above, an example in which there is one network node other than the base station is explained; however, a combination of a plurality of other network nodes (for example, MME and S-GW) may be used.

Information, signals (information, etc.) may be output from a higher layer (or lower layer) to a lower layer (or higher layer). It may be input and output via a plurality of network nodes.

The input/output information can be stored in a specific location (for example, a memory) or can be managed in a management table. The input/output information may be overwritten, updated, or added. The information can be deleted after outputting. The inputted information can be transmitted to another device.

The determination may be based on a value represented by a single bit (0 or 1), a true or false value (Boolean: true or false), or a numerical comparison (For example, comparison with a given value).

Each of the aspects/embodiments described in the present disclosure may be used alone, in combination, or alternatively in execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, if software is transmitted from a website, server, or other remote source using at least one of wired technology (Coaxial, fiber-optic, twisted-pair, or digital subscriber line (DSL)) and wireless technology (Infrared, microwave, etc.), at least one of these wired and wireless technologies is included within the definition of a transmission medium.

Information, signals, or the like mentioned above may be represented by using any of a variety of different technologies. For example, data, instructions, commands, information, signals, bits, symbols, chips, etc. that may be referred to throughout the above description may be represented by voltage, current, electromagnetic waves, magnetic fields or magnetic particles, optical fields or photons, or any combination thereof.

The terms described in the present disclosure and those necessary for understanding the present disclosure may be replaced with terms having the same or similar meanings. For example, at least one of a channel and a symbol may be a signal (signaling). The signal may also be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)," "radio base station," "fixed station," "NodeB," "eNodeB (eNB)," "gNodeB (gNB)," "access point," "transmission point," "reception point," "transmission/reception point," "cell," "sector," "cell group," "carrier," "component carrier," and the like can be used interchangeably. The base station may also be referred to with the terms such as a macro cell, a small cell, a femtocell, or a pico cell.

The base station may contain one or more (For example, three) cells, also called sectors. In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a base station performing communication services in this coverage and to a portion or the entire coverage area of at least one of the base station subsystems.

In the present disclosure, the terms "mobile station (Mobile Station: MS)," "user terminal," "user equipment (User Equipment: UE)," "terminal" and the like can be used interchangeably.

A mobile station may also be referred to by one of ordinary skill in the art as a subscriber station, mobile unit, subscriber unit, wireless unit, remote unit, mobile device, wireless device, radio communication device, remote device, mobile subscriber station, access terminal, mobile terminal, wireless terminal, remote terminal, handset, user agent, mobile client, client, or some other appropriate term.

At least one of a base station and a mobile station may be called a transmitting device, a receiving device, a communication device, or the like. Note that, at least one of a base station and a mobile station may be a device mounted on a moving body, a moving body itself, or the like. The mobile may be a vehicle (For example, cars, planes, etc.), an unmanned mobile (For example, drones, self-driving cars,), or a robot (manned or unmanned). At least one of a base station and a mobile station can be a device that does not necessarily move during the communication operation. For example, at least one of a base station and a mobile station may be an Internet of Things (IoT) device such as a sensor.

The base station in the present disclosure may be read as a mobile station (user terminal, hereinafter the same). For example, each aspect/embodiment of the present disclosure may be applied to a configuration in which communication between a base station and a mobile station is replaced by communication between a plurality of mobile stations (For example, it may be called device-to-device (D2D), vehicle-to-everything (V2X), etc.). In this case, the mobile station may have the function of the base station. Further, words such as "up" and "down" may be replaced with words corresponding to communication between terminals (For example, "side"). For example, terms an uplink channel, a downlink channel, or the like may be read as a side channel.

Similarly, the mobile station in the present disclosure may be replaced with a base station. In this case, the base station may have the function of the mobile station.

The radio frame may be composed of one or more frames in the time domain. Each frame or frames in the time domain may be called a subframe.

The subframes may also be composed of one or more slots in the time domain. The subframes may be of a fixed time length (For example, 1 ms) independent of numerology.

The numerology may be a communication parameter applied to at least one of the transmission and reception of a signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

The slot may consist of one or more symbols (Orthogonal Frequency Division Multiplexing (OFDM)) symbols, Single Carrier Frequency Division Multiple Access (SC-FDMA) symbols, etc., in the time domain. A slot may be a unit of time based on the numerology.

A slot may include a plurality of minislots. Each minislot may consist of one or more symbols in the time domain. A minislot may also be called a subslot. A minislot may be composed of fewer symbols than slots. The PDSCH (or PUSCH) transmitted in time units greater than the minislot may be referred to as the PDSCH (or PUSCH) mapping type A. The PDSCH (or PUSCH) transmitted using the minislot may be referred to as the PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be referred to as the transmission time interval (TTI), multiple consecutive subframes may be referred to as the TTI, and one slot or minislot may be referred to as the TTI. That is, at least one of the subframes and the TTI may be a subframe in the existing LTE (1 ms), a period shorter than 1 ms (For example, 1-13 symbols), or a period longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called a TTI, one or more TTIs (That is, one or more slots or one or more minislots) may be the minimum time unit for scheduling. The number of slots (number of minislots) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTIs shorter than the normal TTI may be called shortened TTI, short TTI, partial or fractional TTI, shortened subframe, short subframe, minislot, subslot, slot, etc.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

A resource block (RB) is a resource allocation unit in the time and frequency domains and may include one or more consecutive subcarriers in the frequency domain. The number of subcarriers included in RB may be, for example, twelve, and the same regardless of the topology. The number of subcarriers included in the RB may be determined based on the neurology.

The time domain of the RB may also include one or more symbols and may be one slot, one minislot, one subframe, or one TTI in length. The one TTI, one subframe, and the like may each consist of one or more resource blocks.

The one or more RBs may be called physical resource blocks (PRBs), sub-carrier groups (SCGs), resource element groups (REGs), PRB pairs, RB pairs, and the like.

The resource blocks may be composed of one or more resource elements (REs). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be specified by an index of the RB relative to the common reference point of the carrier. PRB may be defined in BWP and numbered within that BWP.

BWP may include UL BWP (UL BWP) and DL BWP (DL BWP). For the UE, one or more BWPs may be set in one carrier.

At least one of the configured BWPs may be active, and the UE may not expect to send and receive certain signals/channels outside the active BWP. Note that "cell," "carrier," and the like in this disclosure may be read as "BWP."

The above-described structures such as a radio frame, subframe, slot, minislot, and symbol are merely examples. For example, the number of subframes included in the radio frame, the number of slots per subframe or radio frame, the number of minislots included in the slot, the number of symbols and RBs included in the slot or minislot, the number of subcarriers included in the RB, and the number of symbols in the TTI, the symbol length, the cyclic prefix (CP) length, and the like can be varied.

The terms "connected" and "coupled," or any variation thereof, mean any direct or indirect connection or coupling between two or more elements and can include the presence of one or more intermediate elements between two elements "connected" or "coupled" to each other. The connection or coupling between elements may be physical, logical, or a combination thereof. For example, "connection" may be read as "access." As used in the present disclosure, two elements may be considered to be "connected" or "coupled" to each other using at least one of one or more wire, cable, and printed electrical connections and, as some non-limiting and non-inclusive examples, electromagnetic energy having wavelengths in the radio frequency, microwave, and optical (both visible and invisible) domains.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on."

The "means" in the configuration of each apparatus may be replaced with "unit," "circuit," "device," and the like.

Any reference to elements using designations such as "first" and "second" as used in this disclosure does not generally limit the quantity or order of those elements. Such designations can be used in the present disclosure as a convenient way to distinguish between two or more elements. Accordingly, references to first and second elements do not mean that only two elements may be employed therein, or that the first element must in any way precede the second element.

In the present disclosure, the used terms "include," "including," and variants thereof are intended to be inclusive in a manner similar to the term "comprising." Furthermore, it is intended that the term "or (or)" as used in the present disclosure is not an exclusive OR.

Throughout this disclosure, for example, during translation, if articles such as a, an, and the in English are added, in this disclosure, these articles shall include plurality of nouns following these articles.

As used in this disclosure, the terms "determining," "judging" and "deciding" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. In other words, "judgment" and "decision" may include regarding some action as "judgment" and "decision." Moreover, "judgment (decision)" may be read as "assuming," "expecting," "considering," and the like.

In the present disclosure, the term "A and B are different" may mean "A and B are different from each other." It should be noted that the term may mean "A and B are each different from C." Terms such as "leave," "coupled," or the like may also be interpreted in the same manner as "different."

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 Radio communication system
20 NG-RAN
100 gNB
110 Reception unit
120 Transmission unit
130 Control unit
200 UE
210 Radio signal transmission and reception unit
220 Amplifier unit
230 Modulation and demodulation unit
240 Control signal and reference signal processing unit
250 Encoding/decoding unit
260 Data transmission and reception unit
270 Control unit
1001 Processor
1002 Memory
1003 Storage
1004 Communication device
1005 Input device
1006 Output device
1007 Bus

The invention claimed is:

1. A terminal comprising:
a control unit that applies a target subcarrier spacing lower than a specific subcarrier spacing in a target frequency band, the target frequency band includes at least a part of a specific frequency range defined with the specific subcarrier spacing as a minimum subcarrier spacing or a frequency band lower than the specific frequency range,
wherein the control unit applies a method different from an initial access method related to the specific subcarrier spacing, for at least a part of an initial access method related to the target subcarrier spacing, and
wherein the initial access method related to the target subcarrier spacing is different from the initial access method related to the specific subcarrier spacing in at least one of a support for a synchronization signal and a support for a control resource set.

2. A base station comprising:
a control unit that applies a target subcarrier spacing lower than a specific subcarrier spacing in a target frequency band, the target frequency band includes at least a part of a specific frequency range defined with the specific subcarrier spacing as a minimum subcarrier spacing or a frequency band lower than the specific frequency range,
wherein the control unit applies a method different from an initial access method related to the specific subcarrier spacing, for at least a part of an initial access method related to the target subcarrier spacing, and
wherein the initial access method related to the target subcarrier spacing is different from the initial access method related to the specific subcarrier spacing in at least one of a support for a synchronization signal and a support for a control resource set.

3. A radio communication system comprising:

a terminal; and a base station; wherein:

the terminal and the base station comprise a control unit that applies a target subcarrier spacing lower than a specific subcarrier spacing in a target frequency band, the target frequency band includes at least a part of a specific frequency range defined with the specific sub-carrier spacing as a minimum subcarrier spacing or a frequency band lower than the specific frequency range, and the control unit applies a method different from an initial access method related to the specific subcarrier spacing, for at least a part of an initial access method related to the target subcarrier spacing, wherein the initial access method related to the target subcarrier spacing is different from the initial access method related to the specific subcarrier spacing in at least one of a support for a synchronization signal and a support for a control resource set.

4. A radio communication method comprising:

applying, by a processor of a terminal, a target subcarrier spacing lower than a specific subcarrier spacing in a target frequency band, the target frequency band includes at least a part of a specific frequency range defined with the specific subcarrier spacing as a minimum subcarrier spacing or a frequency band lower than the specific frequency range, and applying, by the processor of the terminal, a method different from an initial access method related to the specific subcarrier spacing, for at least a part of an initial access method related to the target subcarrier spacing, wherein the initial access method related to the target subcarrier spacing is different from the initial access method related to the specific subcarrier spacing in at least one of a support for a synchronization signal and a support for a control resource set.

* * * * *